United States Patent

[11] 3,575,015

| [72] | Inventors | Hubert Geisthoff<br>Donrath;<br>Hans-Heinrich Welschof, Geber, Germany |
|---|---|---|
| [21] | Appl. No. | 834,305 |
| [22] | Filed | June 18, 1969 |
| [45] | Patented | Apr. 13, 1971 |
| [73] | Assignee | Firma Jean Walterscheid K.G.<br>Sieburg, Germany |
| [32] | Priority | June 21, 1968 |
| [33] | | Germany |
| [31] | | P 17 50 948.7 |

[54] SPLINED SHAFT CONNECTION
3 Claims, 1 Drawing Fig.

[52] U.S. Cl. .................................................. 64/23
[51] Int. Cl. ..................................................... F16d 3/06
[50] Field of Search .......................................... 64/6, 9, 14,
23, (Inquired); 74/(Inquired)

[56] References Cited
UNITED STATES PATENTS

| 2,839,902 | 6/1958 | Glover | 64/9X |
| 3,068,980 | 12/1962 | Smirl | 64/23X |
| 3,069,875 | 12/1962 | Crum | 64/23 |
| 3,235,953 | 2/1966 | Adams | 64/6X |

*Primary Examiner*—Mark M. Newman
*Assistant Examiner*—Randall Heald
*Attorney*—Edmund M. Jaskiewicz

ABSTRACT: A shaft has external splines on an end thereof which interfit with internal splines formed in a socket in the end of a second shaft. At least one land of the external splines has a beveled end with the other land ends being square. A spring-loaded pin projects through a radial bore between lands of the internal splines. The pin functions as a spring detent and assures the correct angular relationship in assembling the splined shafts.

Patented April 13, 1971
3,575,015
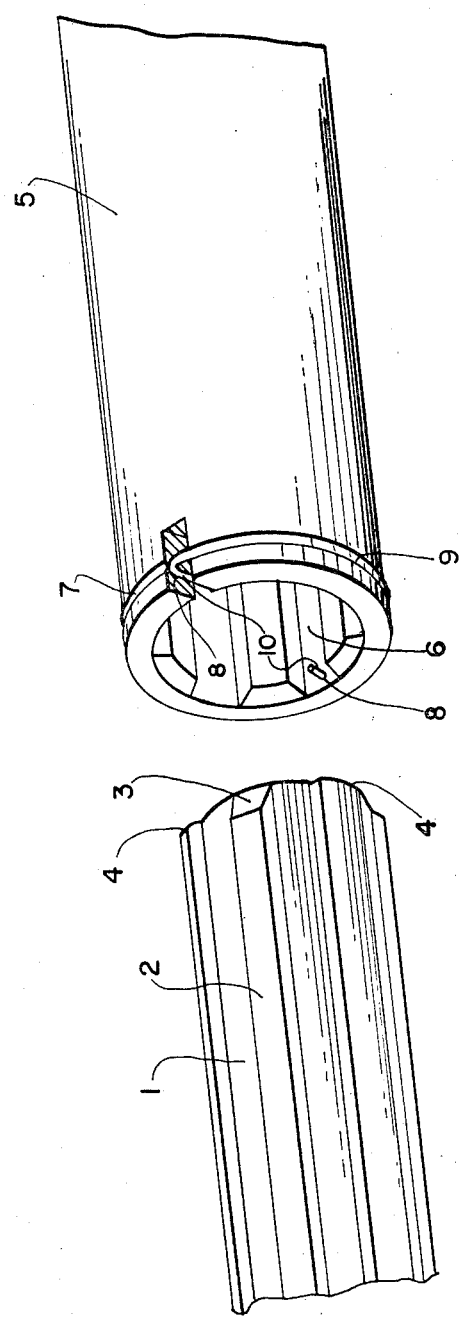
INVENTORS
HUBERT GEISTHOFF
HANS-HEINRICH WELSCHOF
BY Edmund M. Jaskiewicz
ATTORNEY

SPLINED SHAFT CONNECTION

The present invention relates to the assembly of universal joint couplings for agricultural machines, more particularly, to a splined connection for such couplings to prevent assembly at incorrect relative rotary angles.

In a drive shaft assembly for a particular application the driving and driven shafts may be interconnected by an intermediate shaft and two double universal joints. However, a synchronous rotation of the driving and driven shafts will not be achieved unless the first and second joints are at a relative angle of 90°. Thus, the two yokes on the intermediate shaft must always be in line and at a particular angular relationship to each other. When such a shaft assembly is employed in agricultural machines the couplings are frequently uncoupled and recoupled for operating reasons. Should these couplings not be coupled together in compliance with the above requirements there may result an irregularity of angular velocity between the driving and driven shafts which may cause considerable damage to the machinery.

Under certain conditions it may be desirable to provide a specific angular displacement between the planes of the joints in order to compensate for an existing unbalance of the driven machine. In such a situation also great care must be taken to recouple the joints to their original predetermined angular relationship.

It has been proposed to provide the axially slidable engageable components with rectangular cross sections with projecting fins on diametrically opposed sides or with asymmetrically positioned fins. Stop means have been utilized to prevent the universal joints from being completely uncoupled. The rectangular cross-sectioned components have not been particularly satisfactory in transmitting high torques and of achieving a nonoscillatory drive at high rates of speed. For use under these torque and speed conditions splined shaft connections are the most satisfactory. In addition, the production of asymmetrically arranged splines is expensive and for maintenance purposes the components of universal joints should be completely separable. The use of a stop structure to prevent complete separation constitutes a possible source of accidents when used in double universal joint couplings between a tractor and an agricultural machine. In some instances it has occurred that the machine has been unhitched but the drive shaft of the tractor has not been uncoupled from the driven shaft of the machine. This may cause a tipping over of the machine when the tractor is driven away.

It is therefore the principal object of the present invention to provide a universal joint structure for ensuring the correct angular relationship between the components of a universal joint shaft assembly when the universal joint is uncoupled and recoupled.

It is another object of the present invention to provide a splined shaft connection which permits a predetermined angular relationship between the shafts to be continuously attained upon repeated uncoupling and coupling of the shafts.

According to the present invention there is disclosed a splined shaft connection which may be used for the mounting of double universal joints on the drive shafts of agricultural machines. In one aspect of the present invention there may be a first shaft having external splines on an end thereof and a second shaft having a socket in an end thereof with internal splines for interfitting with the external splines. One of the shafts has a beveled end on at least one of the lands of its splined end and the remaining lands of the shaft are square. The other of the shafts has square ends on all of the lands of its splined end. A radially extending opening is provided between the lands of the splines near the end of the shaft having square ends on all of its lands. A spring-loaded pin is positioned in this radial opening and projects between the lands of the splined end. According to the present invention either one of the splined shafts may have at least one bevel end on a land of its splines and the other shaft provided with a spring biased detent pin. In the embodiment of the invention disclosed herein the shaft with the external splines has a beveled end on a land and the shaft with the internal splines is provided with the spring biased detent pin.

This arrangement insures the same angular relationship between the assembled splined shafts even after repeated uncoupling and coupling. Only the land with the beveled end can be received between the lands of the other shaft where the spring detent is positioned. The beveled end of a land will urge the spring detent upwardly to enable the one splined end to be received within the other splined end. When a land with a square end is attempted to be inserted between the splines of the second shaft having the spring pin the spring pin will effectively bar entry of this square ended land and the operator will immediately know that this is not the proper angular relationship between the two splined shafts.

Other objects and advantages of the present invention will be apparent upon reference to the accompanying description when taken in conjunction with the following drawing, which is exemplary.

In the drawing there is shown a perspective view of the uncoupled splined ends of two shafts incorporating the beveled land end and spring detent pin according to the present invention.

As may be seen in the drawings, a shaft 1 is provided with symmetrical external splines on an end thereof with the splined end having a plurality of lands 2. The land 2 and a second land diametrically opposed therefrom are each provided with beveled ends 3. The ends of the remaining lands are square as may be seen at 4.

A second shaft of the connection is indicated at 5 and is provided with a socket 6 having a corresponding internally splined end for interfitting with the external splines of shaft 1. A peripheral groove 7 is formed in shaft 5 adjacent its end thereof and holes 8 are drilled radially from the bottom of the groove 7 into the spaces between adjacent lands on diametrically opposite sides of the socket ended shaft 5.

A spring bale or semicircular member 9 is positioned in the groove 7 and is provided with angles or bent ends 10 which project through the radial openings 8 and into the spaces between the internal splines.

When the two shafts 1 and 5 are to be coupled together the externally splined end 1 can be inserted into the internally splined socket 6 of the other shaft only when the beveled ends 3 of the lands enter the spaces between the internal splines in which are positioned the off-angled ends 10 of the spring bale. The ends of the square ended lands of the external splines are not able to push the ends of the bale out of their paths. It is thus apparent that the cooperating relationship of lands with beveled ends and spring biased detent pins ensures that the two shafts 1 and 5 can be coupled in only one particular angular relationship. Repeated uncoupling and coupling of such shafts, such as may occur in the operation of agricultural machines will ensure the correct angular relationship between the coupled shafts or universal joints and intermediate shafts in a drive shaft assembly.

It will be understood that this invention is subject to modification in order to adapt it to different uses and conditions.

We claim:

1. A splined shaft connection to provide a predetermined angular relationship in the connection between two shafts comprising a first shaft having external splines on an end thereof, a second shaft having a socket in an end thereof with internal splines for interfitting with said external splines, one of said first and second shafts having a beveled end on one of the lands of its splined end and the ends of the remaining lands thereof being square, the other of said shafts having square ends on all of the lands of its splined end, a radial bore between the lands of said other shaft splines near the end of the shaft, and a spring-loaded pin in said radial bore projecting between the lands of the splined end a distance such as to block a square-ended land of a spline on said one shaft but permitting the beveled-ended land thereof to cam the pin radially outwardly so that the splined ends of said one and said other shafts are interfitted in a predetermined angular relationship upon each connection of the shafts.

2. In a splined shaft connection as claimed in claim 1 wherein said first shaft has a beveled end on a land of its external splines and said second shaft has said bore and spring-loaded pin between lands of its internal splines.

3. A splined shaft connection as claimed in claim 2 and comprising a peripheral groove around said second shaft through said radial bore, and a spring bale within said groove and having a bent end inserted into said bore.